(12) United States Patent
Wang

(10) Patent No.: US 8,086,013 B2
(45) Date of Patent: Dec. 27, 2011

(54) IMAGE PROCESSING APPARATUS AND IMAGE PROCESSING METHOD

(75) Inventor: Caihua Wang, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 845 days.

(21) Appl. No.: 12/167,667

(22) Filed: Jul. 3, 2008

(65) Prior Publication Data

US 2009/0010520 A1    Jan. 8, 2009

(30) Foreign Application Priority Data

Jul. 4, 2007    (JP) ................................. 2007-176587

(51) Int. Cl.
    *G06K 9/00*    (2006.01)
(52) U.S. Cl. ...................................... 382/132
(58) Field of Classification Search .................. 382/128, 382/131, 132
    See application file for complete search history.

(56) References Cited

U.S. PATENT DOCUMENTS

| 6,411,298 B1 | 6/2002 | Goto et al. |
| 2006/0062425 A1 | 3/2006 | Shen et al. |

FOREIGN PATENT DOCUMENTS

| EP | 0 908 849 A1 | 4/1999 |
| JP | 10-11614 A | 1/1998 |
| JP | 2004-173748 A | 6/2004 |
| JP | 2007-111533 A | 5/2007 |
| WO | 97/50058 A1 | 12/1997 |

OTHER PUBLICATIONS

Notice of Reasons for Rejection, dated Aug. 19, 2010, issued in corresponding JP Application No. 2007-176587, 6 pages in English and Japanese.
JP Notice of Reasons for Rejection, dated Mar. 17, 2010, issued in corresponding JP Application No. 2007-176587, 5 pages with English translation.
Notice of Reasons for Rejection, dated Jun. 2, 2010, issued in corresponding JP Application No. 2007-176587, 5 pages in English and Japanese.

*Primary Examiner* — Jurie Yun
(74) *Attorney, Agent, or Firm* — Sughrue Mion, PLLC

(57) ABSTRACT

An image processing apparatus characterized by including a device which recognizes, in a bone part unit, a bone area extracted from a medical image and including a bone region constituted of several bone parts, a device which is used to select the bone region to be displayed, a device which is used to determine the bone parts corresponding to the selected bone region, a device which is used to determine a viewpoint and a sight line direction for observing the selected bone region, a device which generates a volume rendering image which displays the bone area with the viewpoint and the sight line direction, based on the bone area of the medical image recognized in the bone part unit, and the determined viewpoint and sight line direction, and a device which is used to conduct control to display the generated volume rendering image.

8 Claims, 10 Drawing Sheets

FIG.8

| ☐ FIRST RIGHT RIB | ☐ STERNUM |
| ☐ SECOND RIGHT RIB | ☐ FIRST LUMBER VERTEBRA |
| ⋯ | ☐ SECOND LUMBER VERTEBRA |
| ☐ FIRST CERVICAL VERTEBRA | ☐ SACRUM |
| ☐ SECOND CERVICAL VERTEBRA | ⋯ |

[MENU ADDITION]  [MENU DELETION]

NAME :

FIG.9

|  | PART 1 | PART 2 | ... | PART n |
|---|---|---|---|---|
| REGION 1 | 1 | 0 |  | 1 |
| REGION 2 | 0 | 1 |  | 1 |
| ... | 1 | 0 |  | 0 |

FIG.10

| REGION | SIGHT LINE DIRECTION | ROTATIONAL AXIS | VIEWPOINT (DISTANCE) | NOTE |
|---|---|---|---|---|
| ALL DATA | (0, -1, 0) | (0, 0, 1) | D | SEEN FROM FRONT OF PATIENT |
| ALL BONE AREA | (0, -1, 0) | (0, 0, 1) | D | DITTO |
| ALL BLOOD VESSEL AREA | (0, -1, 0) | (0, 0, 1) | D | DITTO |
| CHEST INSIDE | (0, -1, 0) | (0, 0, 1) | 0 | DITTO |
| CHEST OUTSIDE | (0, -1, 0) | (0, 0, 1) | D | DITTO |
| VERTEBRA | (0, -1, 0) | (0, 0, 1) | D | DITTO |
| RIGHT RIB | (1, 0, 0) | (0, 0, 1) | D | SEEN FROM LEFT SIDE OF PATIENT |
| LEFT RIB | (-1, 0, 0) | (0, 0, 1) | D | SEEN FROM RIGHT SIDE OF PATIENT |
| PELVIS | (0, 0, -1) | (1, 0, 0) | D | SEE FROM ABOVE PATIENT |

IMAGE PROCESSING APPARATUS AND IMAGE PROCESSING METHOD

BACKGROUND OF THE INVENTION

1. Field of the Invention

The present invention relates to an image processing apparatus and an image processing method, and particularly relates to an image processing apparatus and an image processing method for displaying an image with an optimal viewpoint and sight line direction by using a bone part unit corresponding to a designated bone region from a bone area extracted from an X-ray CT image in a medical image.

2. Description of the Related Art

Conventionally, medical diagnosis is widely performed by using the sectional images of the insides of human bodies of CT, MRI, PET and the like, and an image diagnosis support system using a computer is known.

At this time, as the preprocessing of MIP (maximum intensity projection) image display, bone number recognition, or bone display in the image diagnosis support system, a bone area is automatically extracted from an X-way CT image.

When it is confirmed whether the result of the automatic bone extraction is correct or not, a volume rendering method generally known is frequently used. However, in the case of the object having a complicated structure such as a skeletal structure, a plurality of structural parts overlay one another to cause partial hiding depending on the position of a viewpoint at the time of displaying the image. In such a case, in order to confirm the bone extraction result of the region of interest, it is necessary to determine the position of the viewpoint so that hiding occurs as little as possible.

For this purpose, for example, a method is conventionally known, in which when the viewpoint position is designated by a mouse from the sectional image of the target area, and the angle indicating the sight line direction is input by a keyboard, a pseudo three-dimensional image in the case of seeing the inside of an organ in the sight line direction from the viewpoint position designated above by using the center projection method is constituted and displayed on the CRT, and the viewpoint position and the sight line direction of the pseudo three-dimensional image can be changed by the mouse and the keyboard (for example, see Japanese Patent Application Laid-Open No. 10-11614).

SUMMARY OF THE INVENTION

However, the method described in the above described Patent Document has the problem that the method is very complicated because a number of operations are required until a desired viewpoint position and sight line direction are disposed again by changing the viewpoint position and the sight line direction from the initial viewpoint position and sight line direction.

The present invention is made in view of the above circumstances, and has an object to provide an image processing apparatus and an image processing method which can easily display a region desired to be observed with an optimal viewpoint and sight line direction without performing a complicated operation.

In order to attain the above described object, a first aspect of the present invention provides an image processing apparatus including a device which recognizes, in a bone part unit, a bone area extracted from a medical image and including a bone region constituted of several bone parts, a device which is used to select a bone region to be displayed, a device which is used to determine the bone parts corresponding to the selected bone region, a device which is used to determine a viewpoint and a sight line direction for observing the selected bone region, a device which generates a volume rendering image which displays the bone area with the viewpoint and the sight line direction based on the bone area of the medical image recognized in the bone part unit, and the determined viewpoint and sight line direction, and a device which is used to conduct control to display the generated volume rendering image.

Thereby, the region desired to be observed can be easily displayed with the optimal viewpoint and sight line direction without performing a complicated operation.

Further, as shown in a second aspect of the present invention, the device which is used to determine the viewpoint and sight line direction holds a table in which initial values of the sight line direction for observing the selected bone region, a rotational axis for rotating the volume rendering image to be displayed and the viewpoint are defined.

Thereby, the user can easily display a bone region with the optimal viewpoint and sight line direction by only selecting the bone region which the user desires to observe.

Further, as shown in a third aspect of the present invention, the initial value of the viewpoint is defined by a distance D in a direction opposite to the sight line direction from a center of gravity of the selected bone region.

Further, as shown in a fourth aspect of the present invention, the distance D is set so that a view angle at a time of seeing a whole of the selected bone region from a position of the viewpoint is in a range of 45 degrees to 60 degrees.

Further, as shown in a fifth aspect of the present invention, the image processing apparatus according to any one of the second to fourth aspects further includes a device which changes the table in which the sight line direction, the rotational axis and the viewpoint are defined.

Thereby, setting and changing the viewpoint are facilitated, and an image based on the viewpoint and the sight line direction with which the user desired to see the image can be displayed.

Further, as shown in a sixth aspect of the present invention, the device which determines the bone parts corresponding to the bone region includes a table in which correspondence of the bone regions and the bone parts is defined in advance.

Thereby, the user can display the region which the user desires to display in the part unit by only selecting the bone region defined in advance.

Further, as shown in a seventh aspect of the present invention, the image processing apparatus according to the sixth aspect further includes a device which is used to change the table in which the correspondence of the bone region and bone parts is defined.

Thereby, the user can arbitrarily define the bone region which the user desires to display.

Further, in order to attain the above described object, an eighth aspect of the present invention provides an image processing method including a step of recognizing, in a bone part unit, a bone area extracted from a medical image and including a bone region constituted of several bone parts, a step of selecting a bone region to be displayed, a step of determining correspondence of the recognized bone parts to the selected bone region, a step of determining a viewpoint and a sight line direction for observing the selected bone region, a step of generating a volume rendering image which displays the bone area with the viewpoint and the sight line direction based on the bone area of the medical image recognized in the bone part unit and the determined viewpoint and sight line direction, and a step of conducting control to display the generated volume rendering image.

Thereby, the user can easily display the region which the user desires to observe at the optimal viewpoint and in the sight line direction without performing a complicated operation by only selecting the bone region which the user desires to display.

As described above, according to the present invention, the region to be observed can be easily displayed with the optimal viewpoint and sight line direction without performing a complicated operation.

BRIEF DESCRIPTION OF THE DRAWINGS

FIG. 8 is an explanatory diagram showing a method for editing a part selection menu;

FIG. 9 is an explanatory diagram showing one example of a table showing the correspondence of bone regions and bone parts;

FIG. 10 is an explanatory diagram showing an example of a table in which an initial sight line direction, an initial rotational axis and an initial viewpoint are defined;

DETAILED DESCRIPTION OF THE PREFERRED EMBODIMENTS

Hereinafter, an image processing apparatus and an image processing method according to the present invention will be described in detail with reference to the attached drawings. In the present invention, a user only designates the region which the user desires to observe, whereby the viewpoint and the sight line direction optimal for observation of the region are automatically determined, and the three-dimensional image seen in the sight line direction from the viewpoint is generated to be displayed.

As one embodiment of the present invention, the case where a user observes a certain bone region in a skeleton area will be described as an example. In the following embodiment, as a medical image, a CT image will be especially described as an example, but the present invention is not limited to the CT image, but can be also applied to a slice image with a plurality of images stacked in layer. Further, what is called a slice image in the present embodiment is also called a sectional image.

Figure 1:
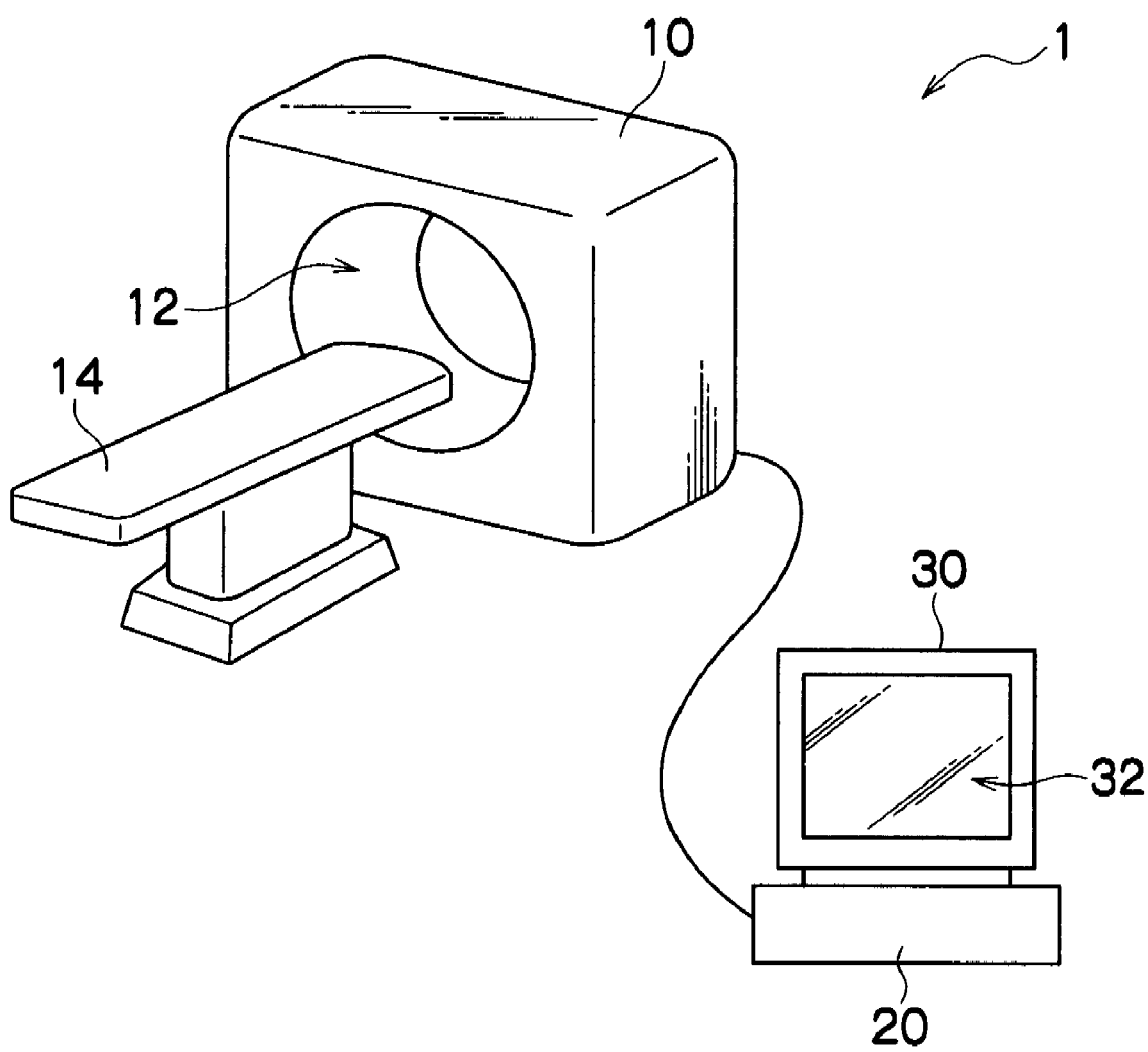
FIG. 1 is a schematic view showing the outline of one embodiment of an X-ray CT apparatus which performs image processing according to the present invention.

FIG. 1 is a schematic view showing the outline of an X-ray CT apparatus which extracts a bone area from a CT image and recognizes the bone in a part unit and constitutes the image of the designated bone region which is seen from the optimal viewpoint and sight line direction.

As shown in FIG. 1, an X-ray CT apparatus 1 is mainly constituted of a scanner gantry section 10 which photographs a CT slice image, an image processing section 20 which performs various kinds of image processing for an obtained CT slice image, and an image display section 30 which displays the processed CT image.

The scanner gantry section 10 has an opening 12, performs irradiation and detection of X rays for a testee (not illustrated) laid on a bed 14 provided with respect to the opening 12, and photographs a CT slice image.

Though the detailed illustration is omitted, a rotary disk is disposed around the opening 12 of the scanner gantry section 10, an X-ray tube which irradiates X-rays and an X-ray detector at the position opposed to the X-ray tube are mounted on the rotary disk, and X-rays are irradiated to one section of the testee while the rotary disk is rotated around the testee laid on the bed 14 to photograph a CT image. Then, while the relative position of the rotary disk with respect to the testee is changed, such photographing of the CT image (slice image) of each section of a testee is repeated, whereby a plurality of image data can be obtained.

The image processing section 20 is the section which receives the CT slice images photographed by the scanner gantry section 10, and executes image processing according to the present invention.

The image display section 30 has a display screen 32 which displays images, such as an LCD (liquid crystal display) and CRT (Cathode Ray Tube), and displays a CT slice image or a reference screen when a user inputs an instruction, or displays a bone, which is selected by the user, in a part unit, though this will be described in detail later.

Figure 2:
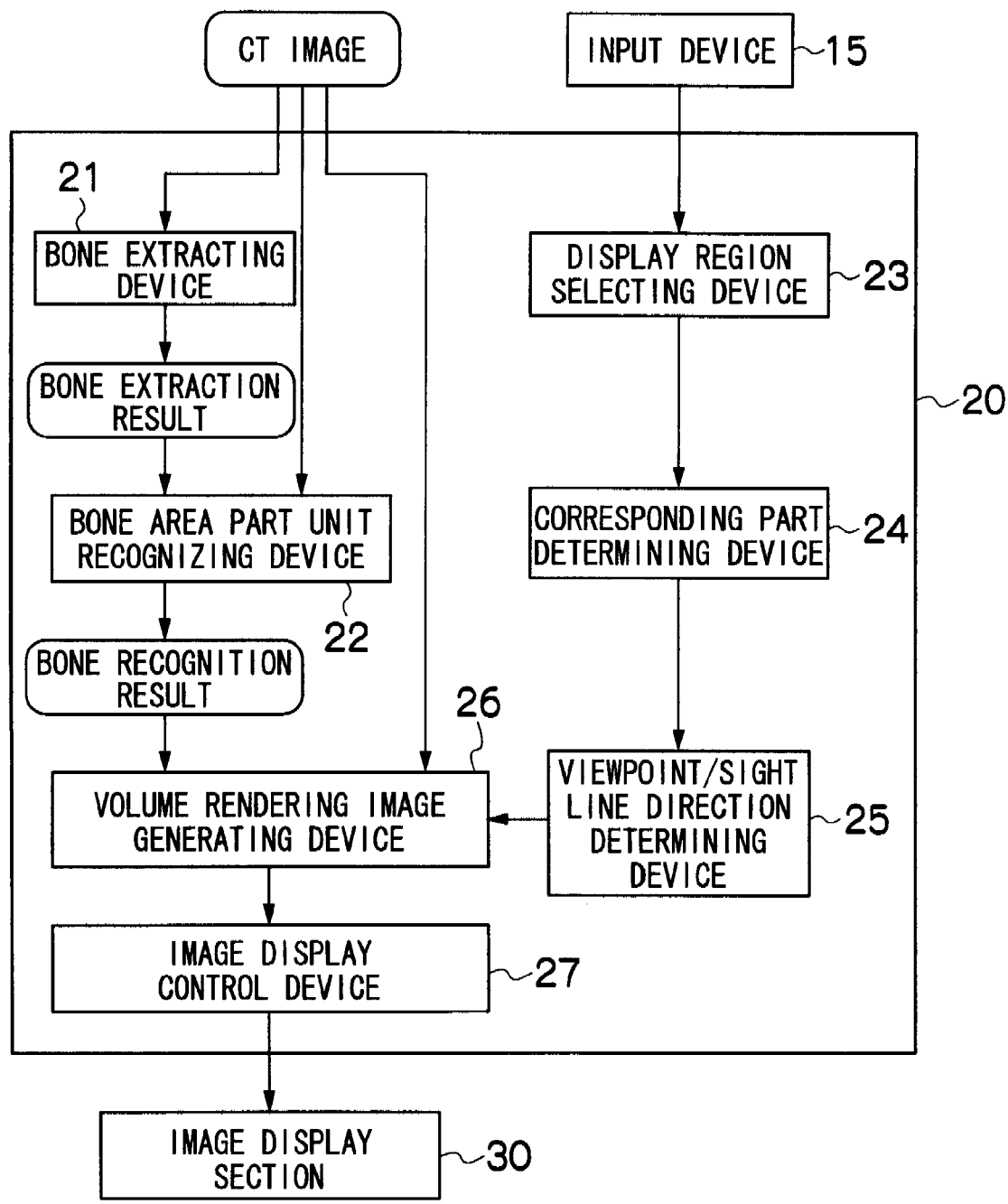
FIG. 2 is a block diagram showing the detailed constitution of an image processing apparatus of the present embodiment.

FIG. 2 shows a detailed constitution of the image processing section 20.

As shown in FIG. 2, the image processing section 20 of the present embodiment is constituted by mainly including a bone extracting device 21, a bone area part unit recognizing device 22, a display region selecting device 23, a corresponding part determining device 24, a viewpoint/sight line direction determining device 25, a volume rendering image generating device 26 and an image display control device 27.

The bone extracting device 21 extracts a bone area from the CT slice image photographed by the scanner gantry section 10. The extracting method is not especially limited, and a bone extracting method which is generally known can be used.

The bone area part unit recognizing device 22 recognizes bones such as a vertebra, rib and pelvis from the extracted bone in the part unit.

The display region selecting device 23 is the device which is used to select the region of the bone which the user desires to display, through an input device 15 such as a keyboard and a mouse while referring to a display screen 32. At this time, the user can also select a plurality of regions which the user desires to display.

Here, the region is what is constituted of several parts, and is a superordinate concept of the part. Specifically, when a user selects the region of a certain bone which the user desires to display, the bone parts which constitute the region are displayed. For example, when the region is a rib, the parts corresponding to the rib are the first rib to the twelfth rib, and when the region is a vertebra, the parts of the vertebra correspond to the first to the seventh cervical vertebrae, the first to the twelfth thoracic vertebrae, and the first to the fifth lumber vertebrae. Other than the correspondence of the regions and parts which are anatomically determined like this, the user may define the correspondence of the regions and parts by designating the parts for himself and giving a name of the region to the parts. Further, several regions may be integrated to be defined as a new region.

The corresponding part determining section 24 is to determine the bone parts corresponding to the bone region selected by the user in the above. The determining method of the parts for a region is not especially limited. For example, a table in which the correspondence of the parts to each of the regions may be defined in advance is set inside the system, and the parts corresponding to the selected region may be determined by referring to the table.

The viewpoint/sight line direction determining device 25 is to determine the optimal viewpoint and sight line direction for the part area corresponding to the region determined by the above described corresponding part determining device 24.

The volume rendering image generating device 26 generates a volume rendering image of the above determined viewpoint and sight line direction based on the bone recognition result from the CT image.

The image display control device 27 is to control the generated volume rendering image to be displayed on the image display section 30. Thereby, the image display section 30 displays the bone parts corresponding to the bone region selected by the user as the image seen with the optimal viewpoint and sight line direction for observing the bone parts.

An operation of the present embodiment will be described hereinafter.

First, the bone extracting device 21 extracts the bone area from the input CT image. As described above, the method for extracting a bone in the bone extracting device 21 is not especially limited, and a bone can be extracted by using a known method.

For example, a method for extracting a bone area by comparing a pixel value profile of a bone with a predetermined threshold value on a CT image is known. Alternatively, there is known a method in which in the case of extracting a rib, an edge image is generated by using an edge extracting filter from a chest photographed image of a testee, and a parabola which looks like a rib is found by using Hough transformation or the like for detecting a parabola from the edge image to detect the rib shape.

The bone extraction result in the bone extracting device 21 is sent to the bone area part unit recognizing device 22.

In the bone area part unit recognizing device 22, region recognition is performed for each CT slice image first. Specifically, the bone area is classified into a cervix, shoulder, thoracoabdominal, pelvis, foot or the like for each CT slice image data.

Next, the bone area is recognized in the part unit. The respective bone parts are given predetermined unique labels.

For example, the method for recognizing a vertebra will be described by using the drawings.

Figure 3:
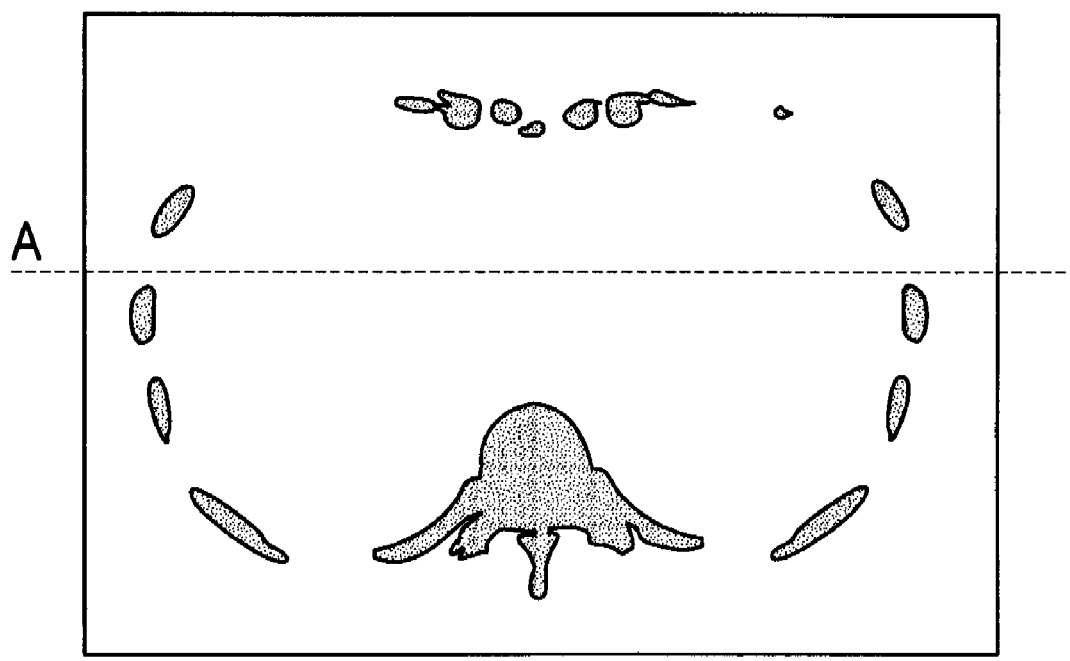
FIG. 3 is an explanatory diagram showing the CT slice image of a vertebra portion.

FIG. 3 shows a CT slice image of the vertebra portion. First, the center line of the vertebra and the lateral width of the vertebra are found. For this purpose, the area at the lower side from a center line A in the body surface vertical direction (specifically, the line in the lateral direction of the body perpendicular to the longitudinal direction of the body in the center in the longitudinal direction of the body in the section perpendicular to the direction of the body axis connecting the head and foot) out of the bone area in FIG. 3 is projected on the horizontal axis, and the density histogram is generated.

Figure 4:
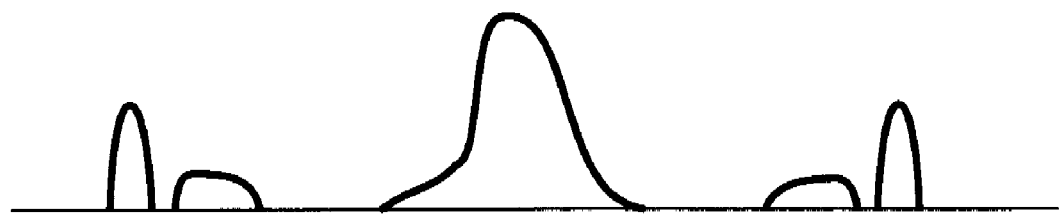
FIG. 4 is a diagram showing a density histogram of a bone area.

FIG. 4 shows the density histogram of the bone area which is generated as above. In the histogram shown in FIG. 4, a large peak is formed in the center and small peaks are formed at the left and right. In the case of the bone area shown in FIG. 3, the rib portions form the small peaks, and since in the vertebra, the largest number of bones are present, the largest peak is considered to be formed. Thus, from the histogram of FIG. 4, the largest peak in the center is detected, and the vertebra area is detected as the portion corresponding to the largest peak.

Figure 5:
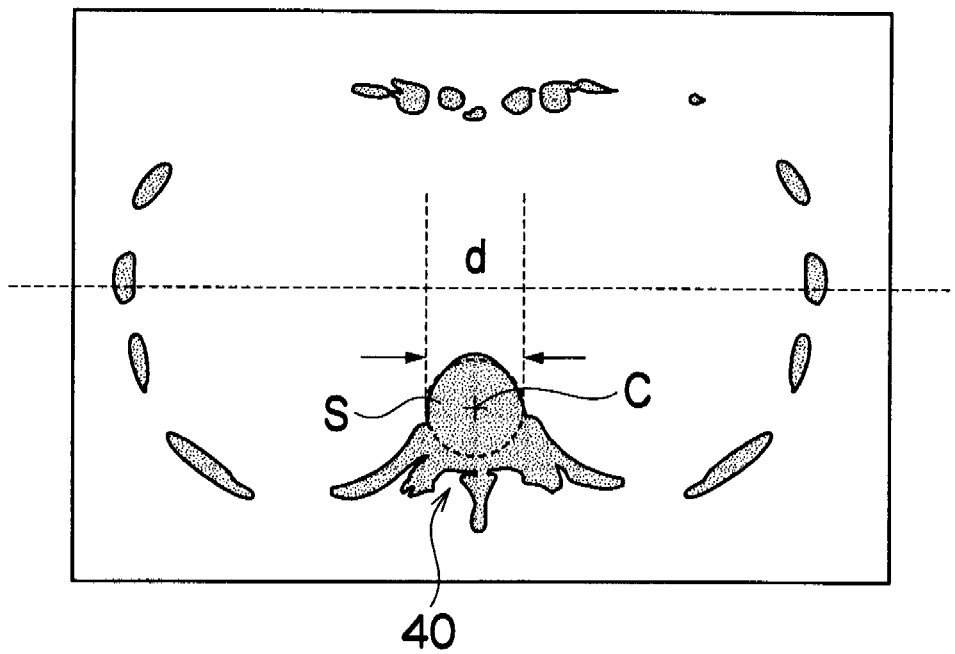
FIG. 5 is an explanatory diagram showing the detection of a vertebra area in the CT slice image of FIG. 3.

As shown in FIG. 5, a circle S is applied to the upper portion of a detected vertebra area 40, and a center C and a width "d" of the vertebra is found. By using the vertebra center C and the vertebra width "d", the vertebra area, the left and right rib areas and the sternum area are recognized.

Figure 6:
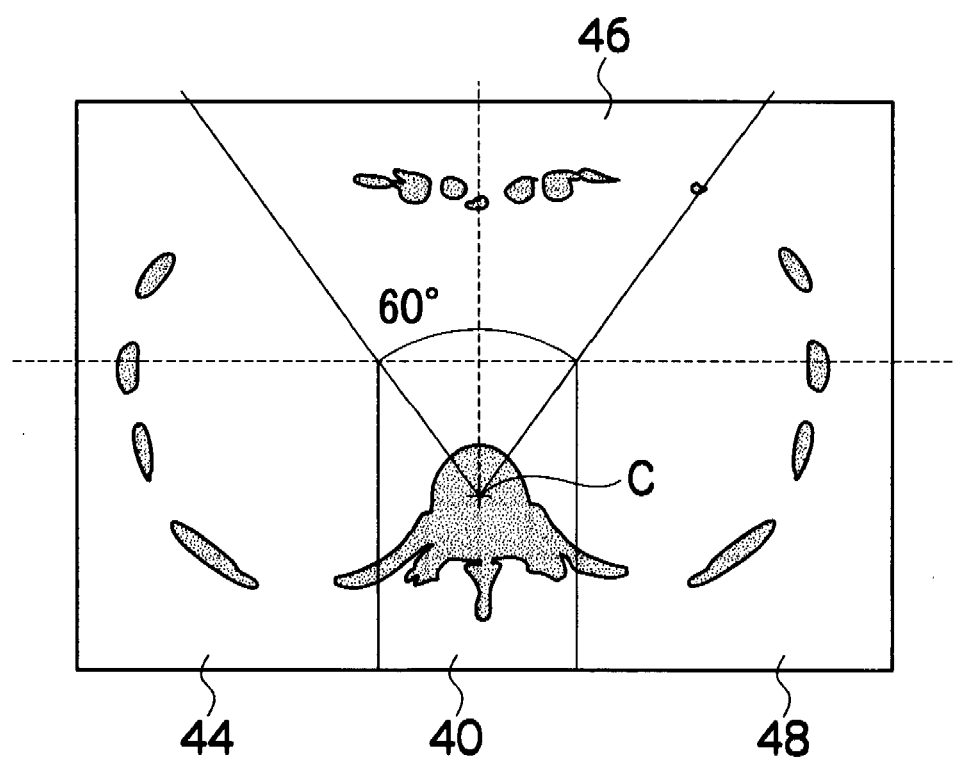
FIG. 6 is an explanatory diagram in which a bone area is divided into each bone region in the CT slice image of FIG. 3.

As shown in FIG. 6, two half lines forming an angle of 60° upward from the vertebra center C which is found above are drawn, and the two parallel lines orthogonal to the center line A in the body surface vertical direction are drawn to include the vertebra center C in the center between the two parallel lines. The distance between the two lines is the width of the vertebra area, and this is set to be 1.5 times as large as the above described width "d".

Thus, the bone area of the CT slice image of FIG. 6 is divided into four areas by the two half lines and the two parallel lines orthogonal to the center line A in the body surface vertical direction, and they are set as the vertebra area 40, a right rib area 44, a sternum area 46 and a left rib area 48.

The bone area part unit recognizing device 22 recognizes bones in the part unit, such as the vertebra, right rib, sternum and left rib like this. The bone area part unit recognizing device 22 gives different labels (numbers) to the recognized bone parts respectively. The bone area part unit recognizing device 22 prepares a three-dimensional table storing the recognition result and gives the labels to the respective voxels of the corresponding bone area. Further, the recognition result may be substituted for the three-dimensional data of the bone extraction result.

In the above example, the bone areas are recognized as the bone parts such as the vertebra, the right rib, the sternum and the left rib, but the bone area may be further divided into small areas like the first right rib, the second right rib and the like, the first cervical vertebra, the second cervical vertebra and the like, and the first thoracic vertebra, the second thoracic vertebra and the like. Specifically, the bone area of each of the CT slice images is similarly recognized, and since the bones show relatively high density values, a gap in the place with high density values is found to be able to recognize the vertebra in the small part unit one by one.

Further, in the display region selecting device 23, the region to be displayed, which is input by the user through the input device 15, is selected. The selection by the user is performed by selecting the region constituted of a plurality of parts defined in advance.

Figure 7:
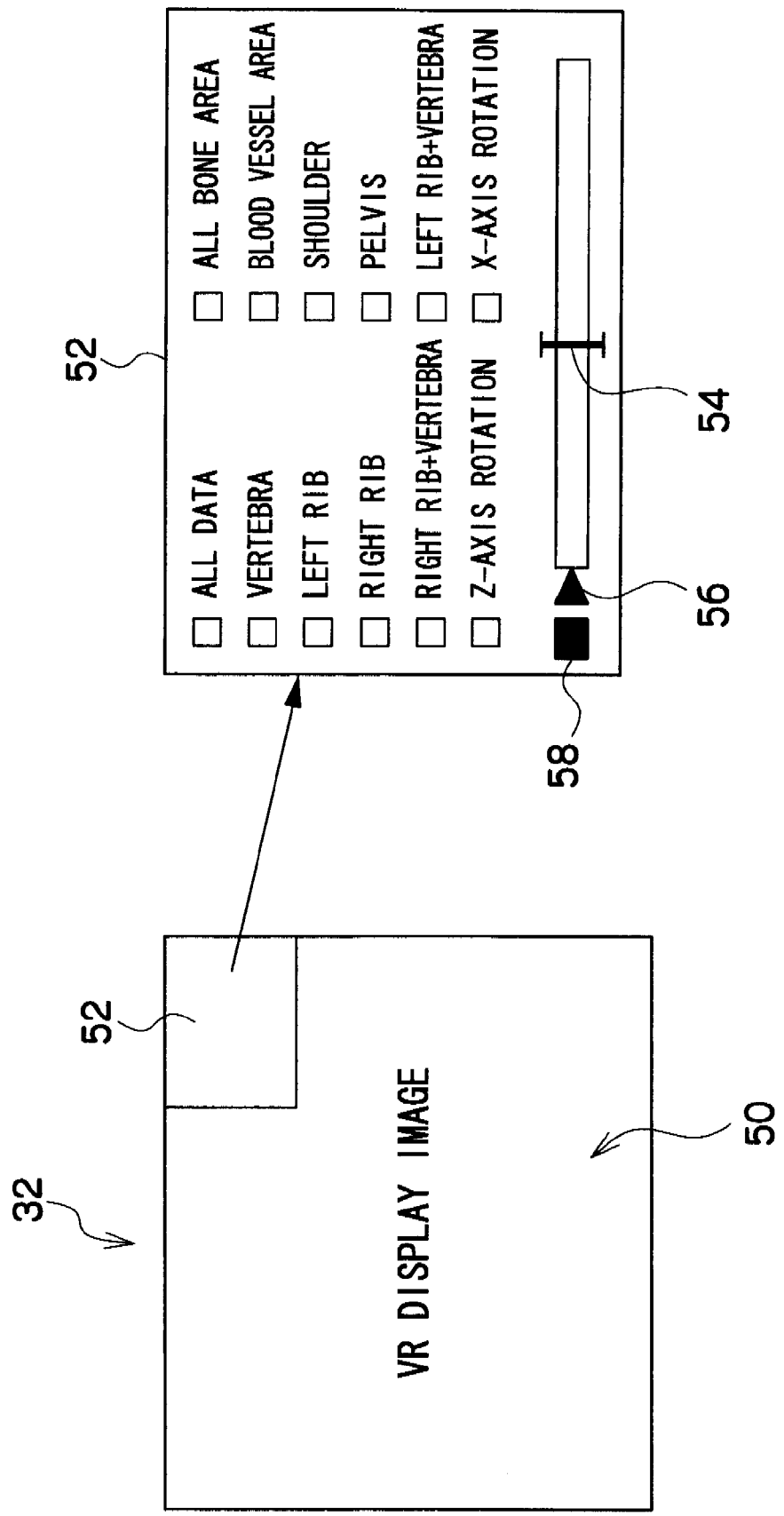
FIG. 7 is an explanatory diagram showing the selection method of a region.

The method for selecting a region is shown in FIG. 7. As shown in FIG. 7, a volume rendering display image 50 is displayed in the display screen 32 of the image display section 30. A display (region selecting display) 52 for selecting the region is displayed in the upper right corner of the display image 50. The region selecting display 52 is shown on the right side of FIG. 7 by being enlarged.

The region selecting display 52 displays the list of the selectable regions, and the user checks the region which the user desires to display in the list. Though described later, as the rotational axis for designating the rotational direction at the time of rotating an image, the one that is optimal for observation from the anatomic structure is set in advance, but the user can designate and change the rotational axis by using the region selecting display 52.

When the region is designated, only the selected region is displayed in the part unit on the display screen 32 by the optimal viewpoint and the sight line direction. The display at the lower side of the region selecting display 52 shows the rotation of the displayed image, and when the user moves an I-shaped cursor 54, the displayed image rotates with this around the optimal rotational axis which is set in advance.

When the user clicks a triangular mark 56, the image automatically rotates, and when the user clicks a square mark 58, the rotation is stopped. By rotating around the rotary shaft which is set to be anatomically optimal for observation like this, the portions which are not visible by overlapping each other or being hidden behind the other portions become all visible.

The correspondence of the region and the corresponding parts is defined in advance, but the user can define the correspondence by newly designating a part and designating the name of the region for the part. Further, two or more regions can be added to make a larger region.

When the user edits a part selection menu by selecting a part like this and designating the name of the region for the part, the user selects several bone parts from the list table of the bone parts anatomically classified on, for example, the screen display as shown in FIG. 8, and the user inputs the name of the region for the bone parts, and designates menu addition, whereby the region which the user newly defines is additionally displayed on the region selection menu of the region selecting display 52 shown in FIG. 7.

Further, when the user deletes the region which the user designated and registered, the user only has to click a menu deletion key.

Further, in the corresponding part determining device 24, the correspondence table of the regions and parts is included, and when a certain region is selected by the user, it is determined which part is displayed. For example, when the user designates a rib, the rib is displayed and the bones other than the rib are not displayed.

FIG. 9 shows the correspondence table of the regions and parts.

The regions are displayed as region 1, region 2 and the like at the leftmost side of the table shown in FIG. 9, and the lists for the parts are respectively displayed as part 1, part 2 and the like at the uppermost side. In the table, 1 is displayed for the part corresponding to each region, that is, the parts to be displayed, and 0 is displayed for the parts not to be displayed.

For example, in FIG. 9, when the region 1 is selected, the part 1 and the part n are displayed, and the parts other than the part 1 and the part n are not displayed. When the part 2 is selected, the part 2 and the part n are displayed, and the parts other than the part 2 and the part n are not displayed.

Further, as described above, when the user selects several bone parts, inputs the name of the region for the bone parts, and designates menu addition, the new correspondence is added to the table showing the correspondence of the bone regions and the bone parts of FIG. 9. Thus, the user can change the table showing the correspondence of the bone regions and bone parts through the input device 15 while looking at the screen display shown in FIG. 8.

Next, determination of the viewpoint and the sight line direction will be described.

The viewpoint/sight line direction determining device 25 includes the table in which the initial sight line direction, the initial rotational axis and the initial viewpoint are defined in advance for each region.

FIG. 10 shows an example of the table in which the initial sight line direction, the initial rotational axis and the initial viewpoint are defined.

In the table shown in FIG. 10, the rotational axis represents the rotational axis when rotating the displayed image within the display screen, and the rotational axis which makes the image most visible from the anatomical structure is set in accordance with each of the regions. The sight line direction and (the direction of) the rotational axis are shown by the directional vectors (X, Y, Z) in the XYZ space.

Here, the method for taking the X, Y and Z axes is such that the direction which is in the body axis direction in an upright human body and points toward the head from the foot is the positive direction of the Z-axis, the direction forward from the body within the plane perpendicular to the Z-axis is the positive direction of the Y-axis, and the direction perpendicular to the Z-axis and the Y-axis and in the right-hand direction is the positive direction of the X-axis.

Figure 11:
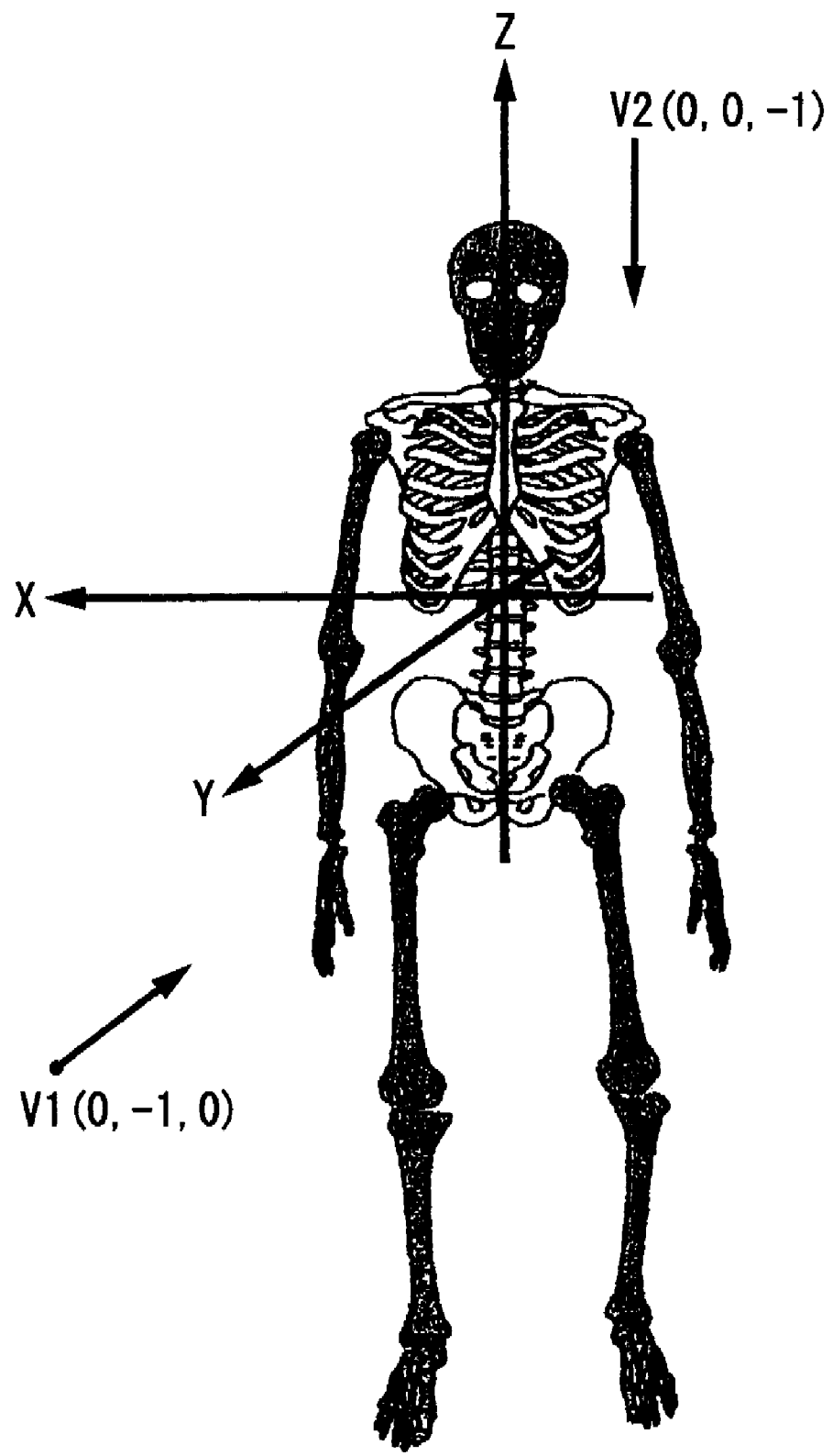
FIG. 11 is an explanatory view showing the correspondence of the sight line directions and a human body.

Accordingly, in FIG. 10, when the region is the all data, the sight line direction is defined as (0, −1, 0), but this is the direction from the position in front of the body to the rear side as shown by a vector V1 (0, −1, 0) in FIG. 11, and the sight line direction in this case is the direction in which a patient (testee) is seen from the front of the body.

Further, in FIG. 10, for example, the sight line direction for the right rib is (1, 0, 0), and this means that only the X-component is the vector of 1, and the sight line direction is the direction which is parallel with the X-axis and in the positive direction of the X-axis. Specifically, in the initial sight line direction of the right rib, the right rib is seen from the left side of the body.

Further, the sight line direction of the pelvis is (0, 0, −1), and this is the direction parallel with the Z-axis and in the negative direction of the Z-axis. Specifically, in this direction, as shown by a vector V2 (0, 0, −1) in FIG. 11, the pelvis is seen from the head.

Further, the rotational axis is such that the X-axis is the rotational axis only in the case of a pelvis, and in the case of all the other regions, the Z-axis is used as the rotational axes.

Further, the initial viewpoint in FIG. 10 is shown by a distance D in the direction opposite to the initial sight line direction from the center of gravity of each area. For example, when the pelvis is observed, the initial sight line direction is the same direction as the Z-axis as described above, the initial rotational direction is the same as the X-axis, and the initial viewpoint is at the place away from the center of gravity of the pelvis area by the distance D along the direction opposite to the initial sight line (specifically, the positive direction of the Z-axis).

Thus, in the present embodiment, the table in which the initial sight line direction, the initial rotational axis and the initial viewpoint (distance D in the direction opposite to the sight line direction from the center of gravity) for each of the regions are defined in advance by the anatomical knowledge is included in the system.

The value of the distance (viewpoint distance) D from the center of gravity to the viewpoint is set so that the view angle (angular field of view) is 45 degrees to 60 degrees when the entire area of the selected region is seen from the view point, for example. In the case of orthogonal projection, projection is performed with parallel rays, and the view angle is 0 degrees. The value of D in the case of the orthogonal projection may be any value if only the viewpoint is outside the body, and the distance D defining the position of the viewpoint may be any value after all if only the value is larger than the distance from the center of gravity of the area to the body surface.

The viewpoint/sight line direction determining device 25 holds the data as shown in FIG. 10 as the internal data, and when the display region is selected, the initial viewpoint and the rotational center are calculated as follows.

Specifically, the viewpoint/sight line direction determining device 25 first calculates the center of gravity (Xw, Yw, Zw)

from the entire part area to which the selected region corresponds. Further, the viewpoint/sight line direction determining device 25 reads the sight line direction corresponding to the selected region from the table of FIG. 10, calculates the point which is away from the center of gravity (Xw, Yw, Zw) by the distance D in the direction opposite to the sight line direction, and sets this point as the viewpoint ($X_0, Y_0, Z_0$).

When the unit vector in the sight line direction is set as "e", the viewpoint ($X_0, Y_0, Z_0$) can be found as follows.

$(X_0, Y_0, Z_0)=(Xw, Yw, Zw)-De$

Here, when De=(Xd, Yd, Zd), the viewpoint (X0, Y0, Z0) becomes as follows.

$(X_0, Y_0, Z_0)=(Xw, Yw, Zw)-(Xd, Yd, Zd)$ $=(Xw-Xd, Yw-Yd, Zw-Zd)$

Further, the center of gravity (Xw, Yw, Zw) of the area is set as the rotational center. Specifically, the straight line which passes through the center of gravity (Xw, Yw, Zw) and is parallel with the rotational axis corresponding to the selected region in FIG. 10 becomes the actual rotational axis.

As above, in the present embodiment, when the user inputs the region, which the user desires to display, through the input device 15, the region is selected by the display region selecting device 23, and the parts corresponding to the selected region are determined in the corresponding part determining device 24. Then, in the viewpoint/sight line direction determining device 25, the sight line direction corresponding to the selected region is determined from the table held in advance, the center of gravity is calculated from the part area, and the rotational center and the viewpoint are determined by calculation.

The volume rendering image generating device 26 generates a volume rendering image by using the bone recognition result from the CT image and the viewpoint and the sight line direction which are determined.

The generated volume rendering image is sent to the image display section 30 through the image display control device 27 and is displayed on the display screen 32 of the image display section 30.

As above, according to the present embodiment, the bone area is recognized in the part unit, and when the user selects the bone region which the user desires to observe, the selected region can be displayed based on the optimal viewpoint and sight line direction by using the bone parts corresponding to the region.

Thereby, the region desired to be observed can be easily displayed with the optimal viewpoint and the sight line direction without performing a complicated operation.

Next, another embodiment of the present invention will be described.

Figure 12:
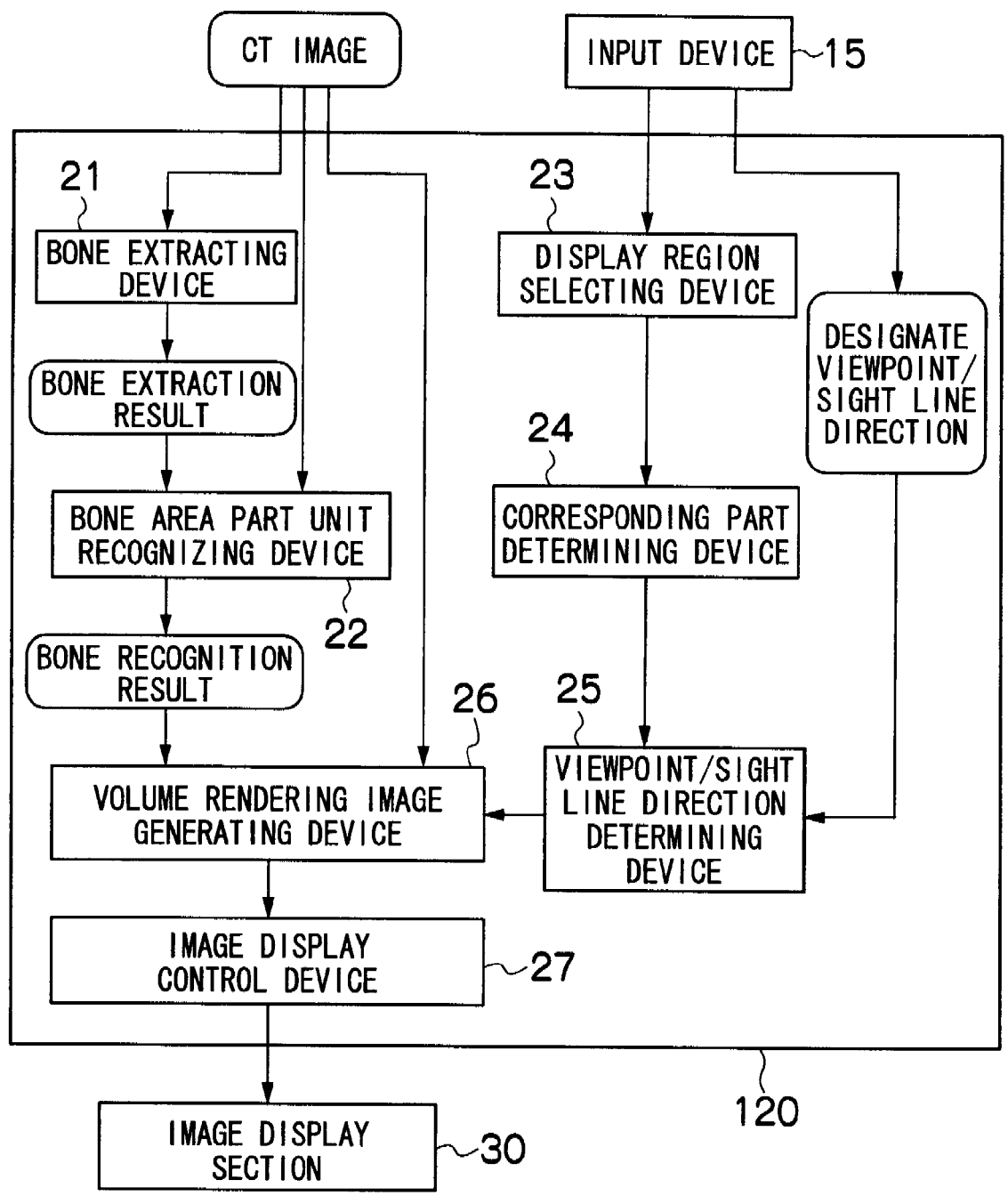
FIG. 12 is a block diagram showing the detailed constitution of an image processing section according to another embodiment of the present invention.

FIG. 12 shows the detailed constitution of an image processing section 120 according to the other embodiment.

The constitution of the image processing section 120 of the other embodiment is substantially the same as the constitution of the image processing section 20 shown in FIG. 2 of the aforementioned embodiment. The point in which this embodiment differs from the previous embodiment is that the user can change the viewpoint/sight line direction by inputting the viewpoint/sight line direction through the input device 15.

Thereby, the user can determine the viewpoint and the sight line direction in advance in such a manner as the user desires to display the area which the user desires to observe.

At this time, the display for inputting the viewpoint/sight line direction is displayed on the screen, and the user can change the table or add to the table as shown in FIG. 10, for example, by inputting the viewpoint (distance D) and the sight line direction by using the input device 15 such as a mouse and a keyboard while looking at the screen.

The input viewpoint/sight line direction are sent to the viewpoint/sight line direction determining device 25, and the table for determining the viewpoint/sight line direction set in advance as shown in FIG. 10 is changed.

As above, in the present embodiment, the initial sight line direction, the initial rotational axis and the initial viewpoint for each of the regions are designated in the viewpoint/sight line direction determining device 25 by the user inputting, but the designation method is not especially limited. For example, the initial sight line direction and the initial rotational axis may be selected from the X-axis, Y-axis and Z-axis, or the component of the directional vector may be directly inputted. In order to designate the viewpoint, for example, "observation from the inside of the body" or "observation from the outside" may be selected, or the distance D from the center of gravity may be directly input.

In the embodiments described above, display of the bone region is described as an example, but the present invention can also be applied to the display of the organs other than the bone area.

The image processing apparatus and the image processing method of the present invention are described in detail above, but the present invention is not limited to the above examples, and, as a matter of course, various improvements and modifications may be made within the range without departing from the spirit of the present invention.

What is claimed is:

1. An image processing apparatus, comprising:
   a device which recognizes, in a bone part unit, a bone area extracted from a medical image and including a bone region constituted of several bone parts;
   a device which is used to select a bone region to be displayed;
   a device which is used to determine the bone parts corresponding to the selected bone region;
   a device which is used to determine a viewpoint and a sight line direction for observing the selected bone region;
   a device which generates a volume rendering image which displays the bone area with the viewpoint and the sight line direction, based on the bone area of the medical image recognized in the bone part unit and the determined viewpoint and sight line direction; and
   a device which is used to conduct control to display the generated volume rendering image.

2. The image processing apparatus according to claim 1,
   wherein the device which is used to determine the viewpoint and the sight line direction holds a table in which initial values of the sight line direction for observing the selected bone region, a rotational axis for rotating the volume rendering image to be displayed and the viewpoint are defined.

3. The image processing apparatus according to claim 2,
   wherein the initial value of the viewpoint is defined by a distance D in a direction opposite to the sight line direction from a center of gravity of the selected bone region.

4. The image processing apparatus according to claim 3,
   wherein the distance D is set so that a view angle at a time of seeing a whole of the selected bone region from a position of the viewpoint is in a range of 45 degrees to 60 degrees.

5. The image processing apparatus according to claim 2, further comprising: a device which is used to change the table in which the sight line direction, the rotational axis and the viewpoint are defined.

6. The image processing apparatus according to claim 1,
wherein the device which is used to determine the bone parts corresponding to the bone region includes a table in which correspondence of bone regions and bone parts is defined in advance.

7. The image processing apparatus according to claim 6, further comprising: a device which is used to change the table in which the correspondence of the bone regions and bone parts is defined.

8. An image processing method, comprising the steps of:
a step of recognizing, in a bone part unit, a bone area which is extracted from a medical image and includes a bone region constituted of several bone parts;
a step of selecting a bone region to be displayed;
a step of determining correspondence of the recognized bone parts to the selected bone region;
a step of determining a viewpoint and a sight line direction for observing the selected bone region;
a step of generating a volume rendering image which displays the bone area with the viewpoint and sight line direction based on the bone area of the medical image recognized in the bone part unit and the determined viewpoint and sight line direction; and
a step of conducting control to display the generated volume rendering image.

* * * * *